(12) United States Patent
Lee et al.

(10) Patent No.: US 6,734,594 B2
(45) Date of Patent: May 11, 2004

(54) VIBRATION MOTOR

(75) Inventors: Ta Kyoung Lee, Suwon-Shi (KR); Woo Seok Yang, Suwon-Shi (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 10/032,117

(22) Filed: Dec. 21, 2001

(65) Prior Publication Data

US 2003/0048028 A1 Mar. 13, 2003

(30) Foreign Application Priority Data

Sep. 10, 2001 (KR) ........................................ 2001-55597
Oct. 15, 2001 (KR) ........................................ 2001-63325

(51) Int. Cl.[7] .............................................. H02K 13/14
(52) U.S. Cl. ................................ 310/220; 310/DIG. 6; 310/248; 310/229; 310/81
(58) Field of Search ...................... 310/81, 248, DIG. 6, 310/238, 229, 230, 219, 220

(56) References Cited

U.S. PATENT DOCUMENTS

| | | | | | |
|---|---|---|---|---|---|
| 3,959,679 | A | * | 5/1976 | Buckley | 310/232 |
| 4,037,125 | A | * | 7/1977 | Aoki | 310/248 |
| 4,529,899 | A | * | 7/1985 | Mabuchi et al. | 310/40 MM |
| 4,705,978 | A | * | 11/1987 | Mabuchi | 310/248 |
| 5,296,774 | A | * | 3/1994 | Nishiwaki | 310/248 |
| 6,359,364 | B1 | * | 3/2002 | Yamaguchi et al. | 310/248 |

* cited by examiner

Primary Examiner—Dang Le
(74) Attorney, Agent, or Firm—Darby & Darby

(57) ABSTRACT

A vibration motor having a rotor and a stator is provided. The vibration motor includes a commutator mounted on the rotor and a brush mounted on the stator. The brush is line contact with the commutator of rotor in order to maintain a stable contact between the commutator and the brush and to reduce spark between the commutator and the brush due to the stable line contact between the commutator and the brush.

5 Claims, 12 Drawing Sheets

VIBRATION MOTOR

BACKGROUND OF THE INVENTION

1. Field of the Invention

The present invention generally relates to a vibration motor suitable for a communication apparatus notifying a user of incoming calls and, more particularly, to a vibration motor having an improved brush of a stator contacting a commutator of a rotor in order to maintain line contact between the brush and the commutator and to stabilize the vibration motor.

2. Background Art

One of essential functions in a communication apparatus is a notifying function to notify a user of incoming calls. Both a vibration mode for vibrating the communication apparatus and a sound mode for generating melody sound or bell sound have been used for the notifying function in the communication apparatus.

In accordance with the user's preference of the notifying function, one of the vibration mode and the sound mode is activated to notify the user of the incoming calls The vibration mode has been used for preventing noise generation and avoiding offensive influences exerted on a group of people by the sound generated in the sound mode.

Generally, in the sound mode, one of a variety of melody sound stored in the communication apparatus is generated from a speaker mounted in the communication apparatus, and the user may be notified by the one of the melody sound generated from the speaker. In the vibration mode, vibration generated from a vibration motor mounted in the communication apparatus propagates to an outer casing of the communication apparatus.

A conventional vibration mode is performed by a vibration motor mounted inside the communication apparatus. The vibration motor having a coin type or a pan cake type in shape and having a diameter greater than a height of the vibration motor is shown in FIGS. 1 and 2.

The vibration motor includes a cover plate 100, a bore 100a formed on a central portion of cover plate 100 and raised from cover plate 100 by a predetermined height, a stationary shaft 140 having a low portion forcibly inserted into bore 100a of cover plate 100, and a first printed circuit board (PCB) 110 disposed on cover plate 100 and coupled to an external power source.

A ring-shaped magnet 130 inserted around shaft 140 is disposed on first PCB 110 and includes N and S magnetic field poles alternatively arranged around shaft 140 to form a ring shape.

A pair of brushes 120 is disposed within a central hole formed on ring-shaped magnet 130 and includes a first end connected to first PCB and a second end upwardly extended and raised from the first end. Brushes 120 are spaced-apart from each other.

A cylindrical case 150 having a circular plate, a circumferential cylindrical side extended from the circular plate, and an opening defined by the circumferential cylindrical side and facing cover plate 100 is coupled to circumferential peripheral side of cover plate 100 to cover an upper side of cover plate 100. A support hole 150a is formed on a central portion of the circular plate of case 150. A low portion of stationary shaft 140 is supported by bore 100a while an upper portion of shaft 140 is supported by supporting hole 150a of cylindrical case 150 when cylindrical case 150 is coupled to cover plate 100.

A stator of the vibration motor includes cover plate 100, shaft 140 supported by both cover plate 100 and cylindrical case 150, first PCB 110 disposed on cover plate 100, ring-shaped magnet 130, the pair of brushes 120, and cylindrical case 150. An eccentric rotor 200 of the vibration motor disposed between ring-shaped magnet 130 and the circular plate of case 150 includes a bearing b rotatably inserted around shaft 140, a second PCB coupled bearing b, a plurality of coils 240, and a commutator 220.

Second PCB 210 is supported by bearing b and rotates about shaft 140. A plurality of commutator 220 is integrally formed on a bottom surface of second PCB facing first PCB. A segment of commutator 220 comes into contact with the second end of brushes 120 coupled to first PCB 110. The external electric power is transmitted to coils 240 through first PCB 110, brushes 120, and commutator 220.

Second PCB 210 includes an insulator 250 filled between coils of rotor 200. Insulator 250 is integrally formed on second PCB 210 with commutator 220 and coils 240 by insert molding. A weight 230 is disposed between two adjacent coils 240 in order to increase the amount of eccentric force.

When the external electric power is fed to first PCB 110, the electric power is supplied to coils 240 through the first ends of the pair of brushes 120 coupled to first PCB 110, commutator 220 being contact with the second ends of brushes 120. Therefore, the interaction between a first magnetic field generated by coils 240 and a second magnetic field generated from ring-shaped magnet 130 rotates rotor 200 about shaft 140.

Since rotor 200 is eccentrically supported by shaft 140, the eccentric rotation of rotor 200 propagates to cover plate 100 and case 150 through shaft 140 and causes case 150 to vibrate. This vibration of case 150 is used for silently notifying a user of incoming calls.

However, brushes 120 in the conventional vibration motor come into unstable contact with commutator 220. Therefore, the unstable contact between brushes 120 and commutator 220 causes electric spark and noise which not only shorten the life time of brushes 120 and commutator 220 of the vibration motor but deteriorate the notifying function of the communication apparatus.

Brushes 120 having an arcuate shape are arranged around opposite sides of shaft 140 as shown in FIGS. 3 and 4. Each of brushes 120 includes a first bending portion 121 bent in a vertical direction from a predetermined portion of the first end, a second bending portion 122 upwardly extended from first bending portion 121 and being slant with respect to both first bending portion 121 and commutator 220, a curved portion 123 extended from second bending portion 122 and being contact with commutator 220.

Curved portion 123 of brushes 120 is bent in both a radial direction a and an arcuate direction while being slant with respect to commutator 220. Since curved portion 123 is bent in lengthwise about the contact between commutator 220 and brushes 120, brushes 120 shows differences h1, h2 between bending curvatures of an inside portion and an outside portion of brushes around the contact. This difference cause curved portion 123 of brushes 120 does not come to uniform contact with commutator. The amount of the contact varies along the width w of brushes 120 between the inside portion and the outside portion of brushes 120 as a gap P varies along the width w of curved bending portion 123 of brushes where curved bending portion 123 is contact with commutator 220.

Therefore, brushes 120 come into partial point contact with commutator 220 because of the differences h1, h2 formed along the width w of curved portion 123 of brushes 120. Non-uniform scratches are formed on commutator 220 as shown in FIG. 6. The non-uniform scratches affect the contact between commutator 220 and brushes 120.

The contact between brushes 120 and commutator 220 becomes irregular because brushes 120 does not come to uniform contact with commutator 220 but come to point contact with commutator.

A lowered current wave lower than a reference current wave d is shown in FIG. 7 in a predetermined period of operation time after the vibration motor operates. As the non-uniform contact between brushes 120 and commutator 220 gradually increases, instantaneous sparks are frequently generated between brushes 120 and commutator 220 due to the increment of current density and instant current density. The abrasion of brushes 120 deteriorates reliability of the vibration motor.

SUMMARY OF THE INVENTION

It is an object of the present invention to provide an improved vibration motor able to prevent non-uniform abrasion of a brush of a stator contacting a commutator of a rotor.

It is another object to provide an improved vibration motor able to maintain a brush of a stator to be line-contact with a commutator of a rotor.

It is still another object to provide an improved vibration motor able to allow a brush of a stator to be uniform contact in a radial direction with a commutator of a rotor.

It is yet another object to provide a vibration motor able to improve the reliability of a stator and a rotor.

It is a further object to provide a vibration motor having an improved brush of a stator in shape.

It is also an object to provide a vibration motor able to prevent a spark phenomenon caused by the non-uniform contact between a brush of a stator and a commutator of a rotor.

These and other objects may be achieved by providing a vibration motor including a cover plate, a case coupled to the cover plate and providing an internal space, a shaft having a low portion forcibly inserted into a bore which is formed on a central portion of the cover plate and raised from the cover plate, a first printed circuit board (PCB) disposed on the cover plate and coupled to an external power source, a magnet disposed on the first PCB and around the bore and including N and S magnetic field poles alternatively arranged around the shaft, a second PCB rotatably supported by a bearing inserted around the shaft and integrally provided with a plurality of commutators on a bottom surface of the second PCB facing the first PCB, an insulator fixing coils on the second PCB, and a pair of brushes disposed within a central hole formed on the magnet and including a first end connected to the first PCB and a second end upwardly extended from the first end and raised from both the first end and the magnet, the second end including a curved bending portion being line contact with the commutator.

The pair of brushes includes a first extension disposed on the first PCB to be coupled to a terminal portion of the first PCB and extended along a straight line parallel to a central line or tangent to an arcuate line formed around the bore, a second extension upwardly extended from the first extension at a first bending line having a first angle with the straight line or the central line and bent in a longitudinal plane, and a curved bending portion extended from the second extension at a second bending line and being line contact with the commutator and bent lengthwise in the arcuate direction around the shaft while the line contact is in a radial direction of shaft and parallel to commutator or the second PCB.

Another embodiment of the vibration motor includes a cover plate, a case coupled to the cover plate and providing an internal space, a shaft having a low portion forcibly inserted into a bore which is formed on a central portion of the cover plate and raised from the cover plate, a first printed circuit board (PCB) disposed on the cover plate and coupled to an external power source, a magnet disposed on the first PCB and around the bore and including N and S magnetic field poles alternatively arranged around the shaft, a second PCB rotatably supported by a bearing about the shaft and integrally provided with a plurality of commutators on a bottom surface of the second PCB facing the first PCB, an insulator fixing coils on the second PCB, and a pair of brushes disposed within a central hole formed on the magnet and including a first end connected to the first PCB and a second end upwardly extended from the first end and raised from both the first end and the magnet, the second end including a curved bending portion being line contact with the commutator and a intermediate portion formed between the first end and the second end and being parallel to one of the first PCB and the second PCB.

The brushes includes a first extension, a second extension upwardly extended from the first extension, the intermediate portion being parallel to the commutator, and the curved bending portion extended from the intermediate portion to be line contact with the commutator.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Turning now to the drawings, FIGS. 8 through 12 shows a first embodiment of a vibration motor adapted to use in a communication apparatus. A curved bending portion 12c of a pair of brushes 12 is formed to be line contact with a commutator 22 regardless of the variation of a distance between brush 12 and commutator 22.

Figure 1:
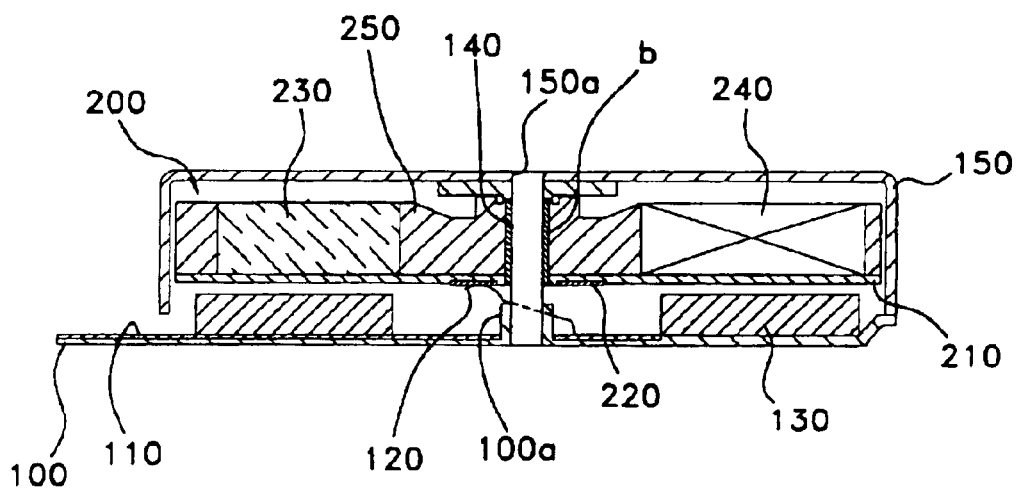
FIG. 1 is a cross-sectional view of a conventional vibration motor.
Figure 2:
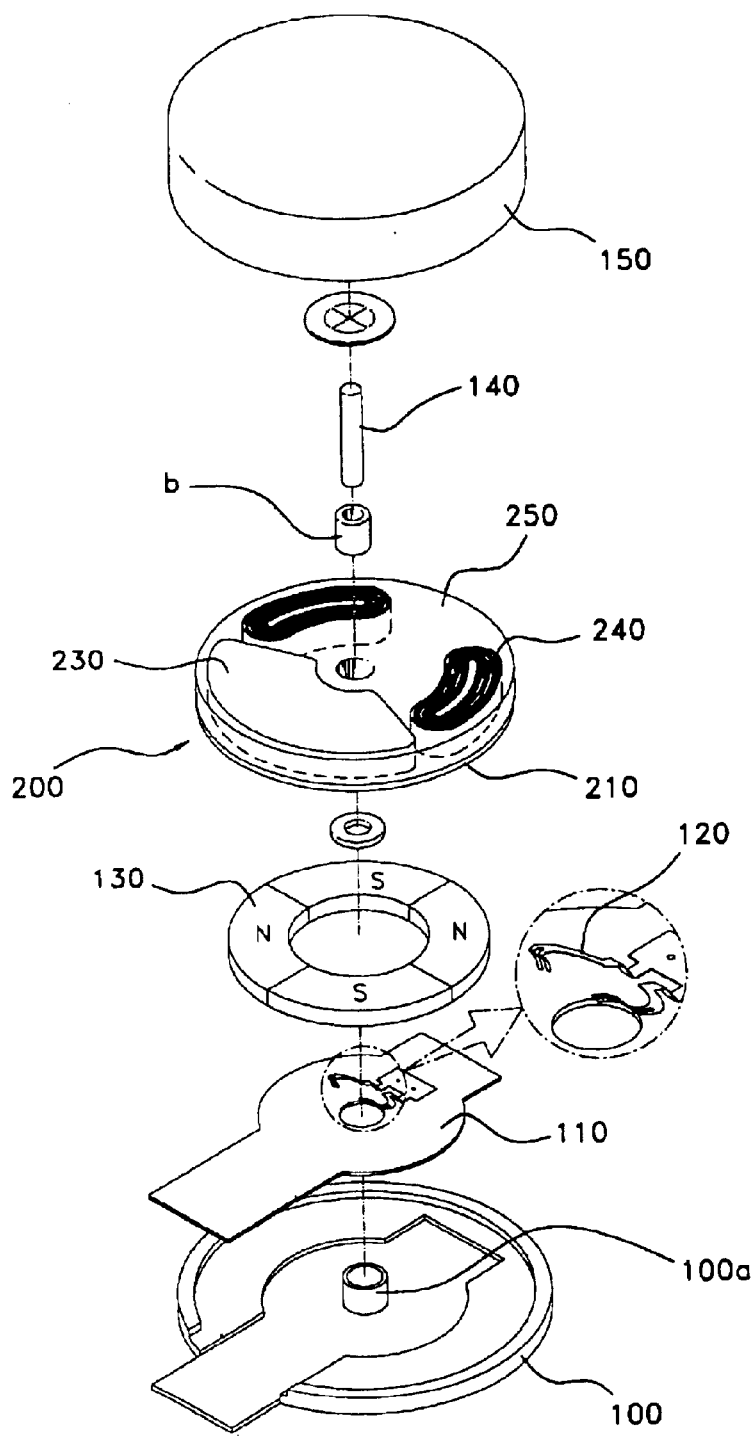
FIG. 2 is an exploded view of the vibration motor of FIG. 1.
Figure 3:
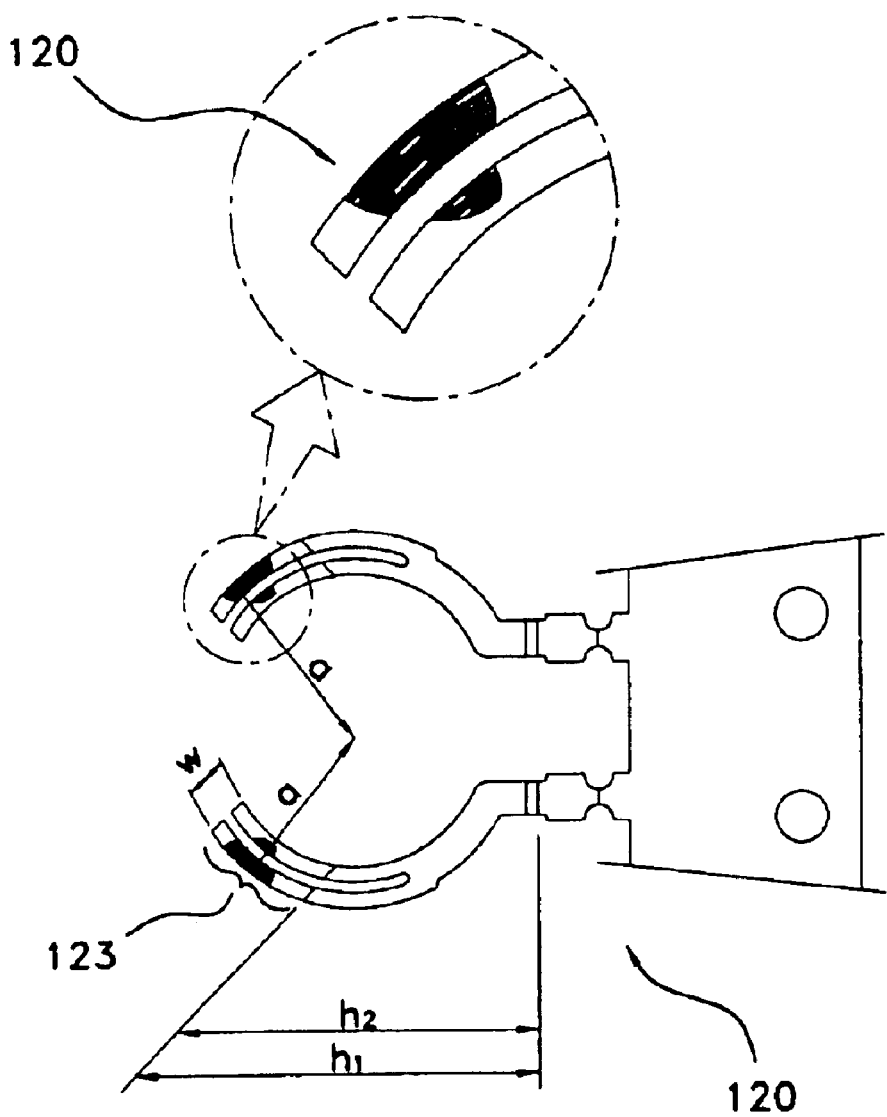
FIG. 3 is a plain view showing a contact area of a brush.
Figure 4:
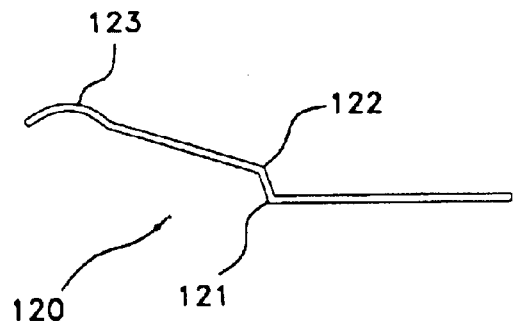
FIG. 4 is a side view of the brush of FIG. 3.
Figure 5:
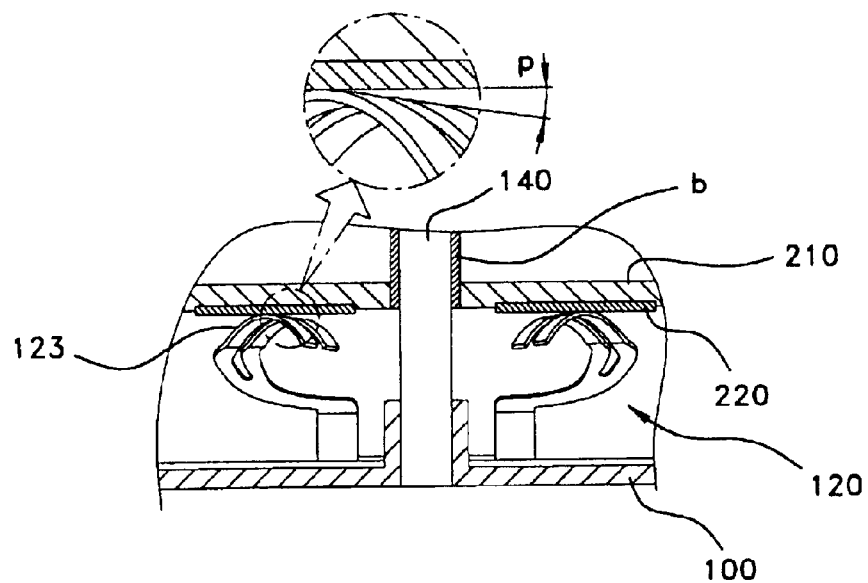
FIG. 5 is a partial cross-sectional view showing a contact area between a brush and a commutator.
Figure 6:
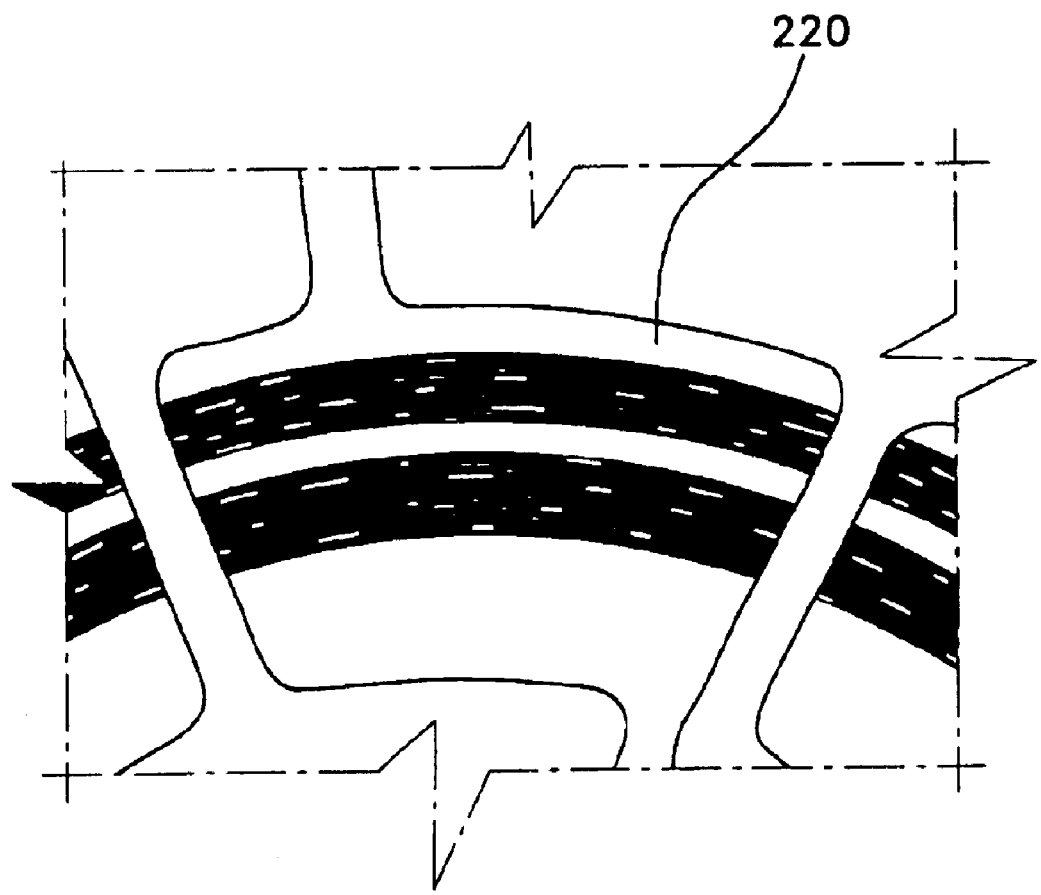
FIG. 6 is a partially enlarged view of a commutator showing a contact area with a brush.
Figure 7:
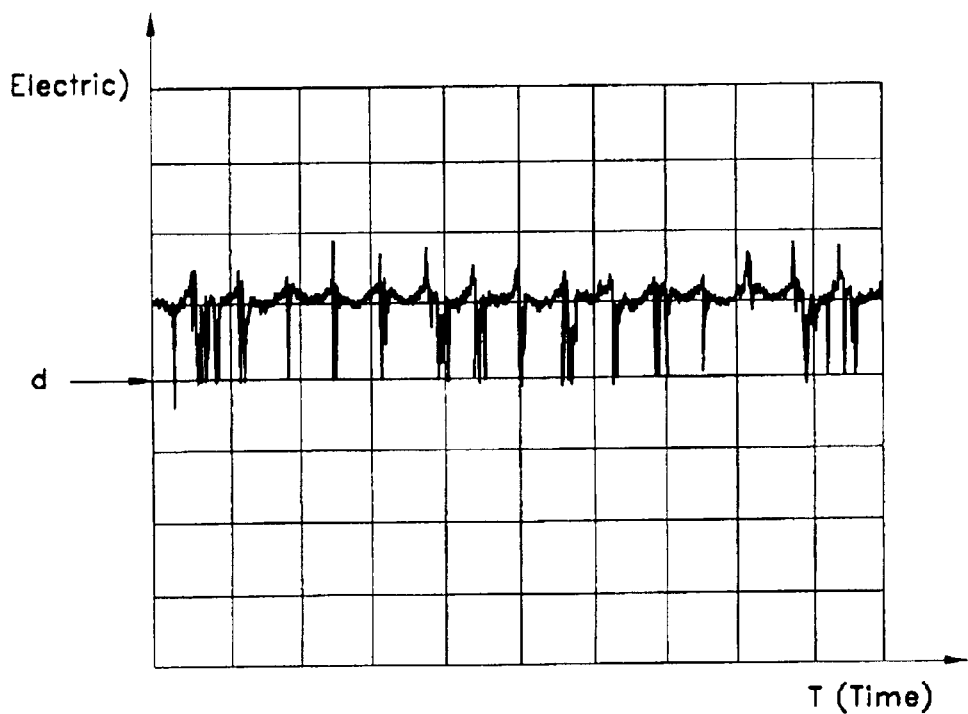
FIG. 7 is a graph showing a current wave transmitted through a brush and a commutator.
Figure 8:
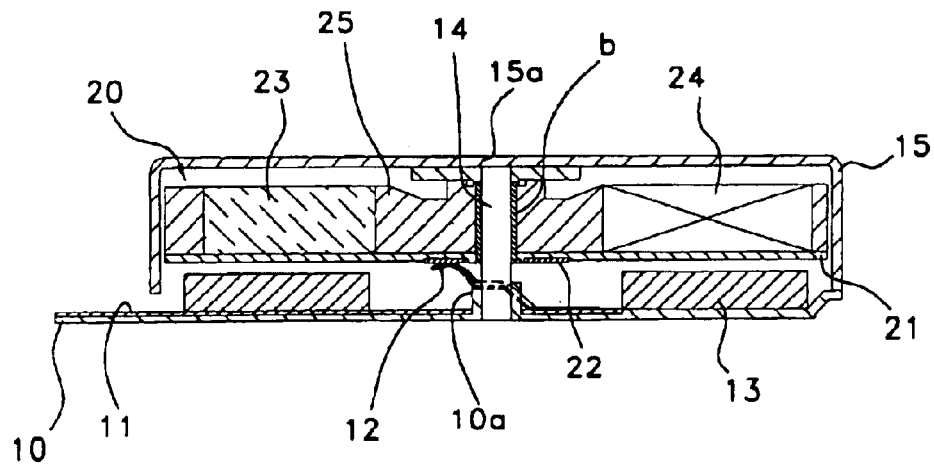
FIG. 8 is a cross-sectional view of a vibration motor constructed according to the present invention.
Figure 9:
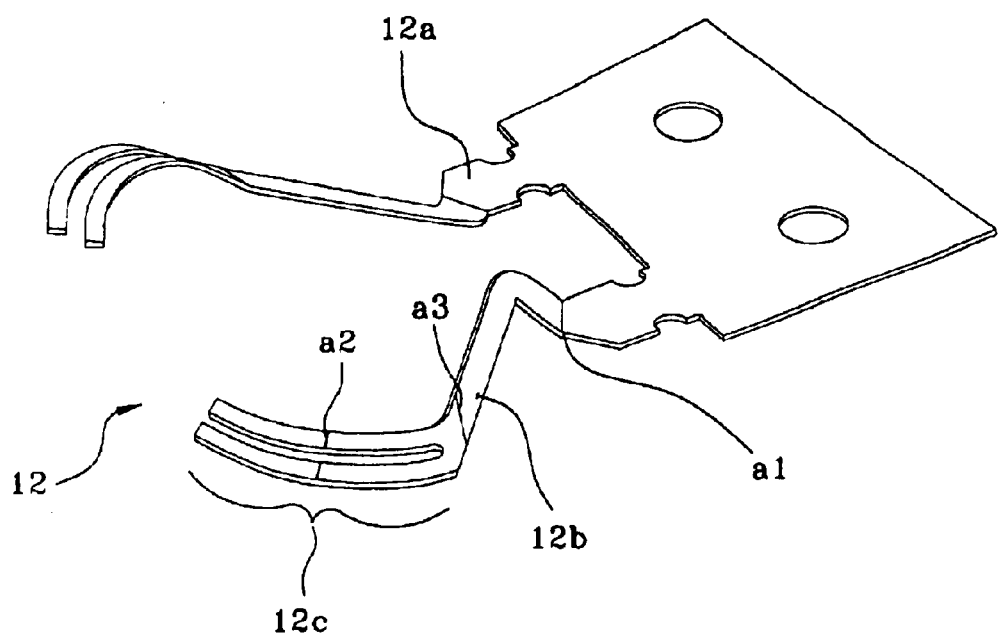
FIG. 9 is a perspective view of a brush of FIG. 8.

As shown in FIG. 8, the vibration motor includes a stator and a rotor. The stator includes a case 15, a cover plate 10, a shaft 14, a first printed circuit board (PCB) 21, and brushes 12 while the rotor includes a second printed circuit board (PCB) 21 supported by a bearing b, a commutator 22, coils 24, a weight 23, and an insulator 25.

Case 15 is a cylindrical structure having a circular plate, a cylindrical side plate extended from a circular peripheral of the circular plate, an opening defined by the circumferential side and facing cover plate 10, and a support hole 15a formed on a bottom of the circular plate and supporting shaft 14. When case 15 is coupled to cover plate 10, the rotor disposed within the opening is enclosed by case 15 and cover plate 10.

When cover plate 10 closes the opening of case 15, cover plate 10 and case 15 are assembled into the vibration motor because shaft 14 tightly and forcibly couples cover plate 10 to case 15. First PCB 11 is disposed on and coupled to cover plate 10 to receive an external electric power from an external power source through either one of cover plate 10 and case 15.

A ring-type magnet 13 is disposed on cover plate 10 and around first PCB 11 and is coupled to cover plate 10.

Ring type magnet 13 includes a plurality of N and S magnetic field poles alternatively arranged around first PCB to form a ring shape. Depending on the number of poles, the number of components needed in the stator increases. It is preferable to have 2 through 6 poles forming ring type magnet 13.

First PCB 11 fixed on cover plate 10 and electrically coupled to the external power source includes the pair of brushes 12 having a first end portion coupled to first PCB and a second end portion contacting commutator 22.

The brushes 12 are spaced-apart from each other. One of brushes 12 as an input function transmits to commutator 22 the external electrical power transmitted to first PCB 11, and the other one of brushes 12 as an output function transmits to first PCB 11 the power source inducted to commutator 22.

A bearing b is rotatably inserted around shaft 14 coupling a central portion of cover plate 10 and a central portion of case 15, and second PCB is fixed on bearing b and rotates by bearing b.

Second PCB is supported by bearing b to be eccentrically rotated by bearing b and shaft 14 and includes a printed circuit portion formed on a surface of second PCB. A plurality of coils 24 and a weight 23 are arranged on a non-printed portion of the surface of second PCB.

Coils 24 and weight 23 is formed in a monolithic structure by insulator 25 in order to increase an eccentric weight, and weight 23 is made of a tungsten alloy having a high specific gravity.

Second PCB includes commutator 22 consisting a plurality of segments formed in an integral body on a bottom of second PCB 21 facing cover plate 10. The number of the segments of commutator 22 is usually two times of the number of the poles of magnet 13.

Brushes 12 constructed according to the principles of the present invention may be changed in shape to improve contact characteristics between brushes 12 and commutator 22, and a contact angle formed between brushes 12 and commutator 22 is changed to allow brushes 12 to be line contact with commutator 22.

As shown in FIGS. 9 through 12, brushes 12 includes the first portion fixed on first PCB to be electrically coupled to the power source and an arcuate portion curved around a bore 10a protruding from cover plate 10 toward the circular plate of case 15.

A first extension 12a is disposed on first PCB to be coupled to a terminal portion of first PCB and extended along a straight line parallel to a central line C or tangent to an arcuate line formed around bore 10a. A second extension 12b is upwardly extended from first extension 12a at a first bending line a1 having a first angle with the straight line or central line C and is bent in a longitudinal plane.

First extension 12a disposed on a first flat plane parallel to first PCB 11 is extended to be disposed adjacent to shaft 14. Second extension 12b extended from first extension 12a is disposed on a second flat plane having a predetermined angle with both first PCB 11 and first extension 12a. Second extension 12b is upwardly raised from first extension 12a at first bending line a1 and bent lengthwise away from shaft 14 in order to avoid being contact and interference with shaft 14 and bore 10a. First bending line a1 is neither perpendicular to a central line C nor parallel to the central line C. A curved bending portion 12c is extended from second extension 12b at a second bending line a3 and has a contact line a2 to be line contact a2 with commutator 22. Curved bending portion 12c is bent lengthwise in the arcuate direction around shaft 14 while the line contact a2 is in a radial direction of shaft 14 and parallel to commutator 22 or second PCB 21.

First bending line a1 is formed between first extension 12a and second extension 12b. Second extension 12b is raised from first extension 12a at first bending line a1 by a predetermined angle with first PCB 11. Therefore, second extension 12b is gradually raised from first bending line a1, and curved bending portion 12c and an upper portion of second extension 12b are spaced-apart from first PCB 11 in order to prevent the interference with first PCB 11.

Curved bending portion 12c extended from second extension 12b is bent along both a first curve having a first predetermined curvature in the arcuate direction of shaft 14 and a second curve having a second predetermined curvature in the arcuate direction with respect to first PCB while maintaining the line contact a2 through the length of curved bending portion 12c. A peak line contact a2 is formed on a peak portion of curved bending portion 12c while any other line contact formed through the length of curved bending portion 12c at any distance from commutator 22 is parallel to first bending line a1 and peak line contact a2. Therefore, curved bending portion 12c is line contact with commutator 22 at ant portion of curved bending portion since line contact a2 is formed through the length of curved bending portion 12c even if the distance between the brush 12 and commutator 22 varies due to the vibration.

The any other line contact is parallel to the peak line contact because the any other line contact is the cut lines of curved bending portion 12c formed when a plane parallel to commutator cuts curved bending portion 12c. Therefore, curved bending portion 12c is maintained to be line contact with commutator 22 even if commutator 22 vibrates.

Figure 10:
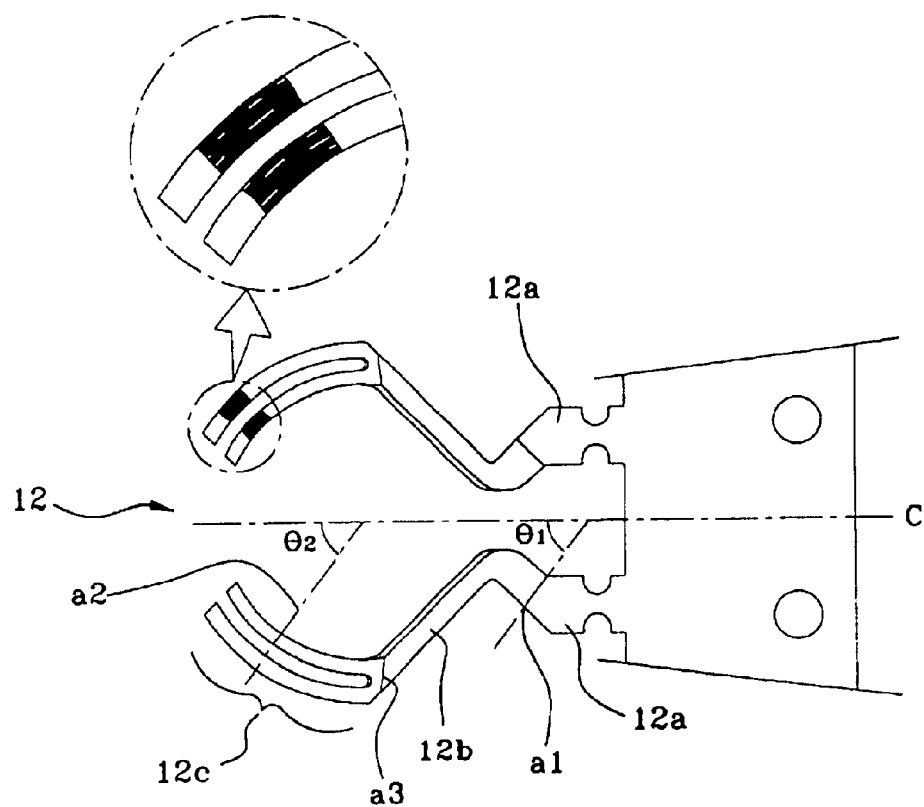
FIG. 10 is a plain view of the brush of FIG. 9.
Figure 11:
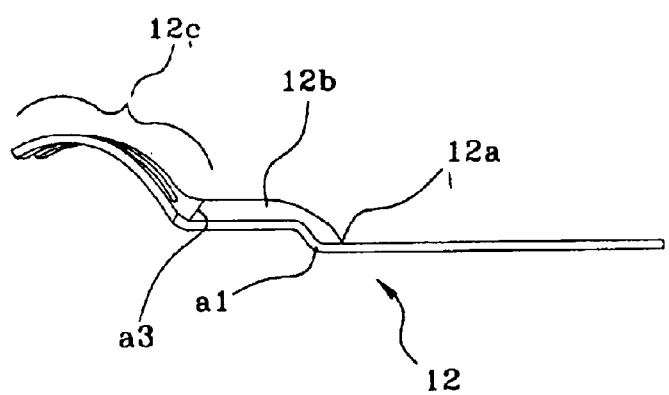
FIG. 11 is a side view of the brush of FIG. 9.

As shown in FIG. 10, first bending line a1 has an angle θ1 which is the same as an angle θ2 formed between second bending line a2 and central line C.

Since θ1 is equal to θ2, curved bending portion 12c may form a line contact with commutator 22 at any portion of curved bending portion 12c. The any line contact a2 is parallel to first bending line a1.

Figure 12:
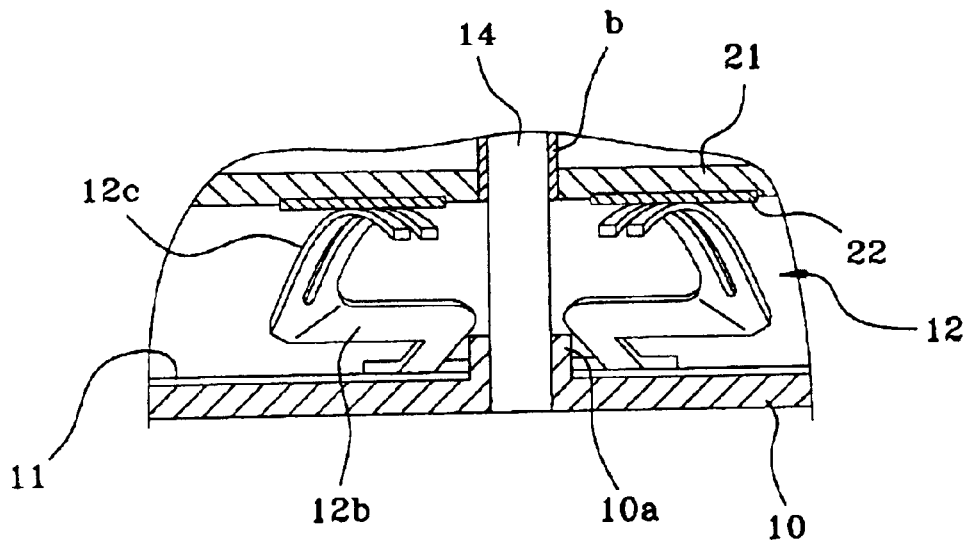
FIG. 12 is a partial cross-sectional view showing a contact area between a brush and a commutator of FIG. 8.
Figure 13:
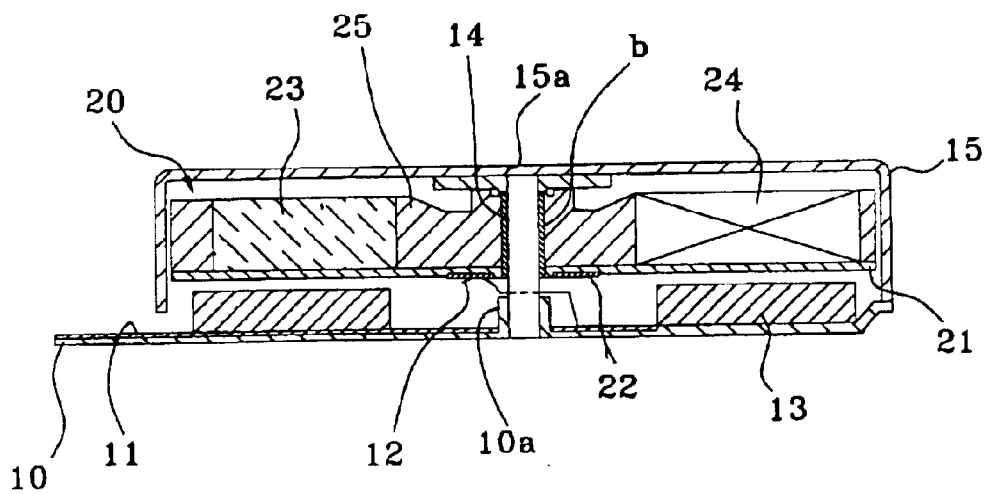
FIG. 13 is a cross-sectional view of a second embodiment of a vibration motor constructed according to the present invention.

FIG. 12 shows a contact area between commutator 22 and curved bending portion 12c of brush 12. The pair of brushes 12 is disposed opposite to each other about shaft 14 in the arcuate direction.

Any portion of curved bending portion 12c of brush 12 is supposed to be line contact with commutator 22 since line contact a2 parallel to first bending line a1 is formed through the length of curved bending portion 12c and since curved bending portion 12c is upwardly raised toward commutator 22.

The any other line contact a2 disposed on both sides of the peak line contact a2 in curved bending portion 12c is parallel to peak line contact a2 and to a surface of commutator 22 while the both sides of curved bending portion 12c disposed about the peak line contact a2 are curved along both the first curvature and the second curvature. Moreover, when a flat plane parallel to commutator 22 cuts a plane on which curved bending portion 12c is placed, the cut line of curved bending portion 12c cut by the flat plane is parallel to first bending line a1 or to the peak line contact a2.

In the vibration motor, when the external power source is supplied to coils 24 of rotor 20 through brush 12 and commutator 22, a magnetic field is generated from coil 24, and rotor 20 rotates around shaft 14 by the electromagnetic force formed between the coil 24 and magnet 13.

Since rotor 20 is eccentrically supported by shaft 14, the eccentric force propagates shaft 14 and case 15 and vibrates the communication apparatus containing the vibration motor.

Brush 12 having curved bending portion 12c bent parallel to first bending line a1 maintains the line contact a2 with commutator 22. Curved bending portion 12c of brush 12 may be line contact with commutator if the distance between commutator 22 of rotor 20 and first PCB 11 varies by the eccentric rotation of rotor 20.

When brush 12 becomes being line contact with commutator 22 in any variance of the distance between commutator 22 and first PCB 11 or first extension 12a of brush 12, a uniform scratch is formed on commutator 22.

Figure 19:
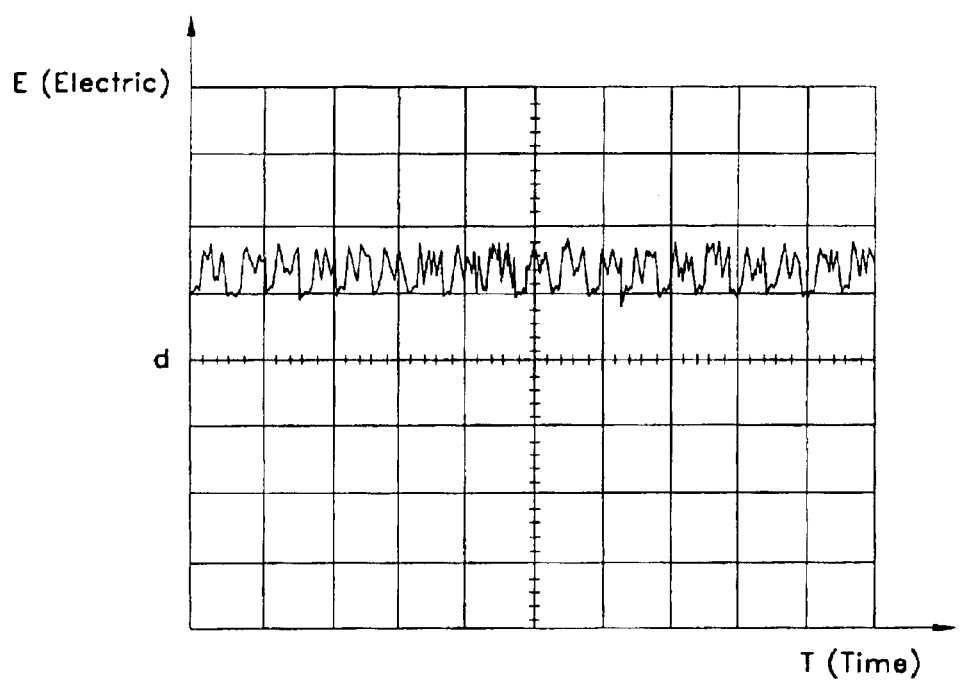
FIG. 19 is a graph showing a current wave transmitted through a brush and a commutator constructed according to the present invention.

As shown in FIG. 19, a stable current wave is shown greater than a reference current due to the stable line contact between commutator 22 and brush 12.

Because curved bending portion 12c of brush 12 is line contact with commutator 22, the contact between brush 12 and commutator 22 becomes stable. Moreover, since the lowered current density reduces the spark and noise, the driving characteristics of the vibration motor are significantly improved.

Since the contacting portion between and commutator 22 and curved bending portion 12c constructed according to the principle of the present invention is greater than the conventional vibration, reliability of the vibration motor is increased due to the uniform abrasion of brush 12.

FIGS. 13 through 17 show a second embodiment of the vibration motor.

Curved bending portion 12c of brush 12 is arranged parallel to a contact area of commutator 22, and brush 12 is line contact with commutator 22.

Figure 14:
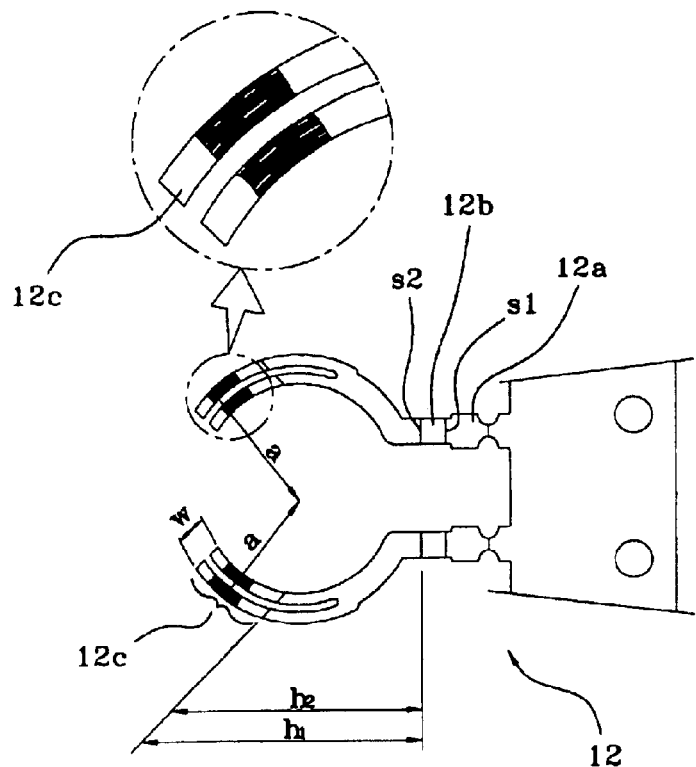
FIG. 14 is a plain view of a brush of FIG. 13.
Figure 15:
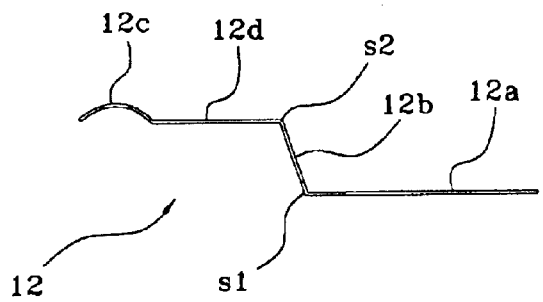
FIG. 15 is a side view of the brush of FIG. 13.

As shown in FIGS. 14 and 15, brushes 12 are arranged to be disposed in arcuate position around bore 10a. Brushes 12 include a first extension 12a disposed on first PCB 11, a second extension 12b upwardly extended from first extension 12a at a first bending portion s1, a curved bending portion 12c extended from second extension 12b, and an intermediate portion 12d disposed between curved bending portion 12c and second extension 12b and horizontally extended from second extension 12b at a second bending portion s2. A peak area of curved bending portion 12c is line contact with commutator 22.

Curved bending portion 12c is rounded-bent along a first curve having a first curvature to form an arcuate longitudinal plate disposed around shaft 14 and upwardly curved from intermediate portion 12d toward commutator 22 and then downwardly curved from the peak area being line contact with commutator 22 to form the arcuate longitudinal plate with respect to first PCB 11 about along a second curve having a second curvature.

Intermediate portion 12d horizontally bent from second extension 12b at second bending portion s2 is disposed parallel to commutator 22 or first PCB 11 as that curved bending portion 12c is allowed to be contact with commutator 22 along the full width of commutator 22 and curved bending portion 12c.

Second bending portion s2 is disposed at a position at a predetermined height as that curved bending portion 12c is disposed to be contact with commutator 22. Therefore, curved bending portion 12c extended from horizontally intermediate portion 12d becomes being full contact with commutator 22.

In FIG. 14, a fork like curved bending portion 12c includes inside an inside extension and an outside extension. A width w of curved bending portion 12c in the direction a is parallel to commutator 22 at the portion where curved bending portion contacts commutator 22 although each length h1, h2 from second bending portion s2 is different from each other at the width w of curved bending portion 12c in the direction a. The Full width of curved bending portion 12c is contact with commutator 22.

Figure 16:
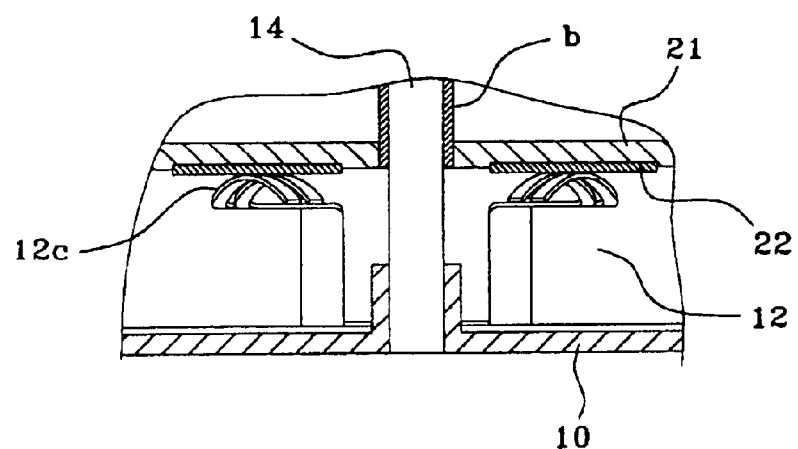
FIG. 16 a partial cross-sectional view showing a contact between a brush and a commutator of FIG. 13.

FIG. 16 is a partial cross-sectional view showing the peak portion of curved bending portion 12c being parallel to commutator 22 so that curved bending portion 12c becomes being line contact with commutator 22. Therefore, the stable line contact is achieved by maintaining curved bending portion 12c to be line contact with commutator 22.

Although curved bending portion 12c of brushes 12 has an arcuate structure disposed around shaft 14, various shape of the curved bending portion of brushes 12 may be used if the peak area of the curved bending portion becomes being line contact with commutator 22 and if any line in width of curved bending portion 12c other than a peak line of the peak area contacting commutator 22 is parallel to the peak line of the peak area. Therefore, the any line is contact with commutator 22 when the any line other than the leak line becomes to contact commutator 22 because of the vibration and the eccentric rotation of the rotor 20.

Figure 17:
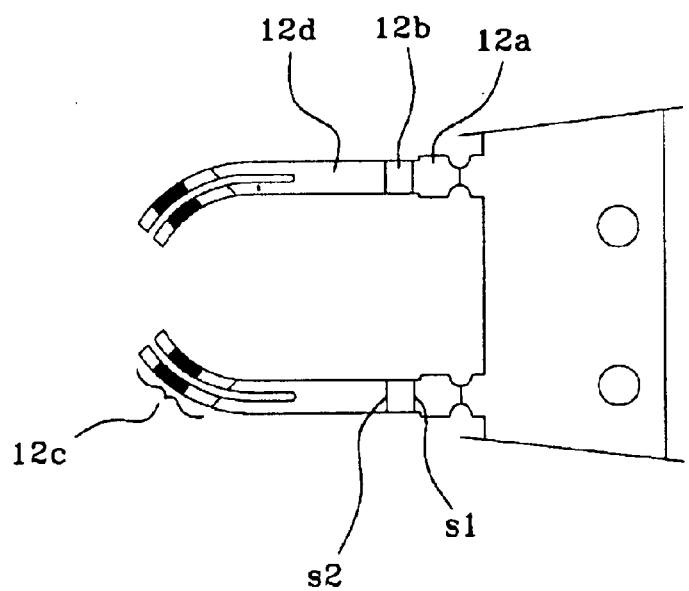
FIG. 17 is a plain view showing a third embodiment of a brush.
Figure 18:
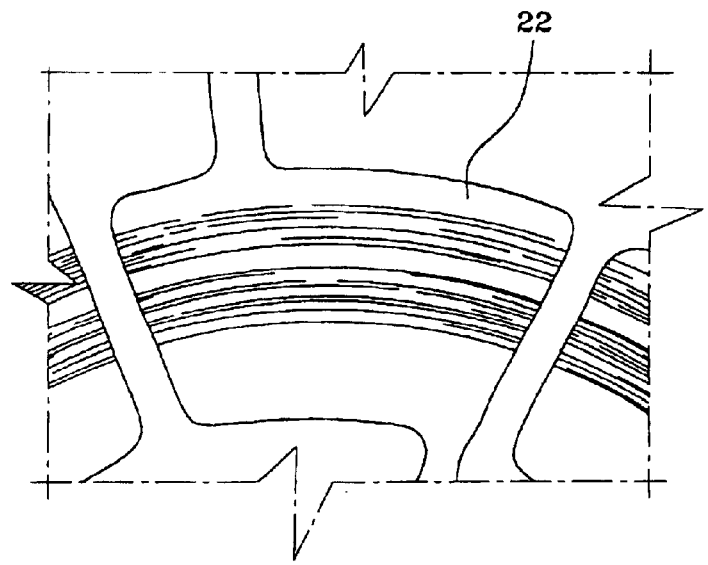
FIG. 18 is a partially enlarged view of a commutator showing a contact with a brush.

The pair of brushes 12 may be parallel to and spaced-apart from each other with respect to shaft 14 or bore 10a as shown in FIG. 17. Each brush 12 includes a first extension 12a, a second extension 12b upwardly bent from first extension 12a at a first bending portion s1 in vertical direction, an intermediate portion 12d horizontally extended from second extension 12b at a second bending portion s2, and a curved bending portion 12c contacting commutator 22.

Curved bending portion 12c of FIG. 17 is the same as the curved bending portion in FIG. 10 in shape.

Curved bending portion 12c is a curved plate curved around shaft 14 while contact line a2 of curved bending portion 12c is perpendicular to shaft 14. Curved bending portion 12c may be a curved plate curved about first PCB 11 while any line formed when a plane parallel to commutator 22 meets curved bending portion 12c is parallel to contact line a2 of curved bending portion 12c. Contact line a2 of curved bending portion 12c may be formed in a radial direction of shaft 14.

The vibration motor rotates around shaft 14 by the electromagnetic force formed between the coil 24 and magnet 13 when the external power source is supplied to coils 24 of rotor 20 through brush 12 and commutator 22 to generate the magnetic field from coil 24.

The eccentric force propagates shaft 14 and case 15 and vibrates the communication apparatus containing the vibration motor since rotor 20 is eccentrically supported by shaft 14.

By the structure of Brush 12 having curved bending portion 12c bent parallel to first PCB 11 or second PCB 21, curved bending portion 12c is maintained to be line contact with commutator 22. Curved bending portion 12c of brush 12 may be line contact with commutator if the distance between commutator 22 of rotor 20 and first PCB 11 varies by the eccentric rotation of rotor 20.

When brush 12 becomes being line contact with commutator 22 in any variance of the distance between commutator 22 and first PCB 11 or first extension 12a of brush 12, a uniform scratch is formed on commutator 22.

As shown in FIG. 19, the graph shows a comparatively stable current wave around a reference current due to the stable line contact between commutator 22 and curved bending portion 12c.

According to the present invention described above, the contact between the brush and the commutator becomes stable because the curved bending portion of the brush is line contact with the commutator. Since the lowered current density reduces the spark and noise, the driving characteristics of the vibration motor are significantly improved. Moreover, since the contacting portion between the commutator and the curved bending portion is greater than the conventional vibration motor, reliability of the vibration motor is increased due to the uniform abrasion of the brush. Therefore, the vibration motor prevents the abrasion of the brushes and exhibits much more reliability. The use of the specific shaped brushes improves the overall line contact between brushes and the commutator.

Although the preferred embodiment of the present invention has been shown and described, it will be appreciated by those skilled in the art that changes may be made in these embodiments without departing from the principles and spirit of the invention, the scope of which is defined in the claims and their equivalents.

What is claimed is:

1. A vibration motor, comprising:
   a cover plate;
   a casing coupled to said cover plate and providing an internal space with said cover plate;
   a shaft coupled between central portions of said cover plate and said casing;
   a first printed circuit board (PCB) mounted on said cover plate;
   a magnet mounted on said cover plate and disposed around sad first PCB;
   a second PCB rotatably supported by said shaft and provided with a commutator having a plurality of segments at a bottom of said second PCB;
   an insulator mounting coils coupled to said commutator to said second PCB; and
   a pair of brushes having one end coupled to said first PCB and the other end extended from said one end toward said commutator and along a first line, the first lines of the brushes converging, said the other end having a curved bending portion extended from said the other end and having a contact line substantially perpendicular to said bending first line to be in line contact with said commutator.

2. The vibration motor of claim 1, with said brush comprising:
   a first extension extended from said one end along said first PCB;
   a second extension upwardly extended from said first extension at said bending line toward said commutator, said second extension spaced-apart from said first PGB and said commutator; and
   said curved bending portion extended from said second extension to be bent with a width line parallel to said commutator and said bending line.

3. A vibration motor, comprising:
   a cover plate;
   a casing coupled to said cover plate and providing an internal space with said cover plate;
   a shaft coupled between central portions of said cover plate and said casing;
   a first printed circuit board (PCB) mounted on said cover plate;
   a magnet mounted on said cover plate and disposed around sad first PCB;
   a second PCB rotatably supported by said shaft and provided with a commutator having a plurality of segments at a bottom of said second PCB;
   an insulator mounting coils coupled to said commutator to said second PCB; and
   a pair of brushes having one end coupled to said first PCB and the other end extended from said one end toward said commutator at a bending line, the one end of both brushes being on the same side of the shaft and the shaft being between the brushes, said the other end having a portion parallel in to said commutator to be line contact with said commutator.

4. The vibration motor of claim 3, with said brush comprising:
   a first extension extended from said one end along said first PCB;
   a second extension upwardly extended from said first extension at a bending line toward said commutator, said second extension spaced-apart from said first PCB and said commutator; and
   a curved bending portion extended from said second extension and bent with a width line parallel to said commutator and said bending line, sad said curved bending portion being in line contact with said commutator.

5. A motor, comprising:

an outer case containing a stator and a rotor, said stator fixed on said casing and having a shaft, said rotor disposed around said shaft to rotate about said shaft, said rotor having a commutator;

a brush having a first end fixedly electrically coupled to said stator and a second end upwardly extended toward said rotor; and a curved bending portion, curving around the shaft and formed on said second end of said brush and having a contact line parallel to said commutator to be electrically in contact with said commutator;

said outer case having a cover plate and a casing coupled to said cover plate and providing an internal space with said cover plate;

said shaft coupled between central portions of said cover plate and said casing;

a first printed circuit board (PCB) mounted on said cover plate;

a magnet mounted on said cover plate and disposed around sad first PCB;

a second PCB spaced-apart from said first PCB, rotatably supported by said shaft, and provided with coils and said commutator coupled to said coils at a bottom of said second PCB;

an insulator mounting said coils to said second PCB; and said brush fixed on said first PCB and extended toward said commutator of said rotor.

* * * * *